United States Patent [19]
Takeo et al.

[11] Patent Number: 5,632,156
[45] Date of Patent: May 27, 1997

[54] AUTOMOTIVE AIR CONDITIONING SYSTEM

[75] Inventors: Yuji Takeo, Toyoake; Satoru Kodama, Obu; Eiji Takahashi, Toyohashi; Akira Isaji, Nishio; Masaya Tanaka, Anjo, all of Japan

[73] Assignee: Nippondenso Co., Ltd., Kariya, Japan

[21] Appl. No.: 429,219

[22] Filed: Apr. 25, 1995

[30] Foreign Application Priority Data

Apr. 25, 1994 [JP] Japan .................................. 6-086772
Aug. 4, 1994 [JP] Japan .................................. 6-183422

[51] Int. Cl.$^6$ .................................................. F24F 11/00
[52] U.S. Cl. ........................... 62/228.4; 62/160; 62/161
[58] Field of Search ........................... 62/228.1, 228.4, 62/228.5, 161, 160, 215, 208, 209, 229; 165/26, 27, 28, 24, 25; 236/91 R, 91 C, 91 B

[56] References Cited

U.S. PATENT DOCUMENTS 5,263,335  11/1993  Isono et al. .......................... 62/228.4
5,316,074   5/1994  Isaji et al. ........................ 62/228.4 X
5,341,868   8/1994  Nakata ............................. 62/161 X

FOREIGN PATENT DOCUMENTS 510570   1/1993   Japan .

Primary Examiner—Harry B. Tanner
Attorney, Agent, or Firm—Cushman, Darby & Cushman

[57] ABSTRACT

An automotive air conditioning system is provided to be able to minutely control the air blow temperature independently of the ambient temperature to maintain the compartment always pleasant. The difference between the revolution speed of a compressor with a temperature setting lever for setting the revolution speed of the compressor set in the left end position and the revolution speed of the compressor with the temperature setting lever set in the left end position is increased in the mid summer or mid winter and reduced in the spring or autumn, whereby the air blow temperature can be minutely controlled to make the inside of the compartment always pleasant.

14 Claims, 6 Drawing Sheets

<COOLING MODE>

<HEATING MODE>

AUTOMOTIVE AIR CONDITIONING SYSTEM

CROSS REFERENCE TO RELATED APPLICATIONS

This application is based upon and claims priority from Japanese Patent Application No. Hei 6-86772 filed Apr. 25, 1994 and Japanese Patent Application No. Hei 6-183422 filed Aug. 4, 1994, with the contents of each document being incorporated herein by reference.

BACKGROUND OF THE INVENTION

1. Field of the Invention

The present invention relates to an automotive air conditioning system. More particularly, the present invention relates to an automotive air conditioning system which is so constructed that a temperature of air blown into a compartment can be controlled by regulating a revolution speed of a compressor driven by electric power supplied from a battery by setting means such as a lever, a switch, etc.

2. Description of the Related Art

According to a related art in which the above automotive air conditioning system is used for an electric vehicle, for example, the revolution speed of the compressor is controlled by regulating a temperature setting lever provided in an instrument panel within a compartment, and thereby the temperature of the air blown into the compartment is regulated.

However, in the above prior art, the revolution speed of the compressor when the temperature setting lever is set to the lowest temperature side and the revolution speed of the compressor when the temperature setting lever is set to the highest temperature side are always equal to each other irrespective of the ambient temperature. That is, the range of the revolution speed of the compressor is always constant irrespective of the ambient temperature.

Therefore, in the mid summer or mid winter when the compressor has to be rotated within a wide range of revolution speed to achieve an ideal air conditioning, there is a problem that even when the temperature setting lever is shifted to the lowest temperature side, a desired low temperature air blow can not be obtained or even when the temperature setting lever is shifted to the highest temperature side, a desired high temperature air blow can not be obtained.

Furthermore, in the spring or autumn when an ideal air conditioning can be obtained even if the compressor is rotated within a less wide range of revolution speed, the temperature setting lever is not shifted through the whole range between the lowest temperature side and the highest temperature side but shifted within a limited range. That is, in the spring or autumn, there is a problem that as the shifting range of the temperature setting lever is narrow, the air blow temperature can not minutely be controlled.

SUMMARY OF THE INVENTION

An object of the present invention is to provide an automotive air conditioning system which can always achieve minute control of the air temperature irrespective of the ambient temperature by changing the range of the revolution speed of the compressor according to the ambient temperature when a temperature setting means such as the above temperature setting lever is shifted from one end to the other end.

In order to achieve the above objective, one preferred mode of an automotive air conditioning system of the present invention includes an air blowing means for generating air flow, an air flow passage for introducing air from the air blowing means, a heat exchanger provided within the air flow passage for cooling or heating the air, a compressor composing a refrigerating cycle with the heat exchanger and driven by a driving power supplied from an external driving power source, a temperature setting means for setting the temperature of air blown out from the air flow passage into a compartment within a range from a minimum temperature to a maximum temperature, a revolution speed controlling means for controlling a revolution speed of the compressor based on a setting value set by the temperature setting means, an ambient temperature detecting means for detecting a temperature of outdoor air, a revolution speed regulating means for regulating a first revolution speed of the compressor when the temperature setting means is set to the minimum temperature and a second revolution speed of the compressor when the temperature setting means is set to the maximum temperature based on an ambient temperature detected by the ambient temperature detecting means.

Other preferred mode of the automotive air conditioning system further includes a first temperature judging means for judging whether or not the detected ambient temperature is equal to or lower than a first temperature, a second temperature judging means for judging whether or not the detected ambient temperature is equal to or higher than a second temperature which is higher than the first temperature, a selecting means for selecting the heat exchanger to function as a heat exchanger for cooling or a heat exchanger for heating, a first selection controlling means for controlling the selecting means when the detected ambient temperature is judged to be equal to or lower than the first temperature by the first temperature judging means to make the heat exchanger function as a heat exchanger for heating, and a second selection controlling means for controlling the selecting means when the detected ambient temperature is judged to be equal to or higher than the second temperature by the second temperature judging means to make the heat exchanger function as a heat exchanger for cooling, wherein the revolution speed regulating means sets the first revolution speed and second revolution speed to be slower as the detected ambient temperature rises when the detected temperature is judged to be equal to or lower than the first temperature by the first temperature judging means, and the revolution speed regulating means sets the first revolution speed and second revolution speed to be faster as the detected ambient temperature rises when the detected temperature is judged to be equal to or higher than the second temperature by the second temperature judging means. Further preferred mode of the automotive air conditioning system includes a setting value detecting means for detecting a setting value of the temperature setting means, a revolution speed increase controlling means for controlling the revolution speed controlling means when the detected ambient temperature is judged to be equal to or lower than the first temperature by the first temperature judging means so that the revolution speed of the compressor can be faster as the setting value detected by the setting value detecting means can be on the maximum temperature side, and a revolution speed decrease controlling means for controlling the revolution speed controlling means when the detected ambient temperature is judged to be equal to or higher than the first temperature by the second temperature judging mean so that the revolution speed of the compressor can be slower as the setting value detected by the setting value detecting means can be on the maximum temperature side.

According to the present invention stated above, when the temperature setting means is set to any position between the minimum temperature and the maximum temperature, the revolution speed controlling means controls the revolution speed of the compressor based on this setting value, whereby the cooling ability or heating ability of the heat exchanger is controlled, and the temperature of the air blow into the compartment is controlled.

Here, the revolution speed regulating means regulates the first revolution speed when the temperature setting means is set to the above minimum temperature based on the ambient temperature and the second revolution speed when the temperature setting means is set to the above maximum temperature based on the ambient temperature respectively. That is, the revolution speed regulating means regulates the range of the revolution speed of the compressor when the temperature setting means is shifted from the above minimum temperature position to the above maximum temperature position based on the ambient temperature. Therefore, if the regulation is made so that the revolution speed of the compressor can be within a range which is suitable to the then ambient temperature, the temperature of the air blow can minutely be controlled to make the inside of the compartment pleasant independently of the ambient temperature.

Further, when the ambient temperature is equal to or lower than the first temperature, the heat exchanger functions as a heat exchanger for heating and the operation mode is the heating mode, and when the ambient temperature is equal to or higher than the second temperature, the heat exchanger functions as a heat exchanger for cooling and the operation mode is the cooling mode.

Here, when the ambient temperature is equal to or lower than the first temperature, that is, when the heating operation is performed, it is so set that the first revolution speed and second revolution speed decrease as the ambient temperature rises.

That is, that the ambient temperature rises within a range of a low ambient temperature in which the heating operation is performed means that the heating ability so much is no longer necessary. Therefore, in the present invention, according to the amount of the heating ability which is no longer necessary, the first revolution speed and second revolution speed are decreased and the revolution speed of the compressor is controlled to be suitable to the then ambient temperature.

On the other hand, when the ambient temperature is equal to or higher that the second temperature, that is, when the cooling operation is performed, it is so arranged that the first revolution speed and second revolution speed increase as the ambient temperature rises.

That is, that the ambient temperature rises within a range of a high ambient temperature in which the cooling operation is performed means that the cooling ability is required so much. Therefore, according to the amount of the required heating ability, the first revolution speed and second revolution speed are increased and the revolution speed of the compressor is controlled to fit the then ambient temperature.

Also, in the present invention as stated in claim 2, the operation mode is automatically selected whether the cooling operation should be performed or the heating operation should be performed according to the ambient temperature, there is no need to provide a cooling operation commanding switch or a heating operation commanding switch.

Still further, in the present invention, when the ambient temperature is equal to or lower than the first temperature, that is, when the heating operation is performed, as the setting value of the temperature setting means becomes nearer the above maximum temperature side, that is, the setting value of the temperature setting means becomes near the side where the temperature of air blow into the compartment is higher, the revolution speed of the compressor becomes faster. Therefore, when the temperature setting means is set to the high temperature side during the heating operation, the temperature of air blow into the compartment becomes higher.

On the other hand, when the ambient temperature is equal to or higher than the second temperature, that is, when the cooling operation is performed, as the setting value of the temperature setting means becomes nearer the above maximum temperature, that is, the setting value of the temperature setting means becomes nearer the side where the temperature of air blow into the compartment is high, the revolution speed of the compressor becomes slower. Therefore, when the temperature setting means is set to the high temperature side during the cooling operation, the temperature of air blow into the compartment becomes higher.

DETAILED DESCRIPTION OF THE PRESENTLY PREFERRED EXEMPLARY EMBODIMENTS

Figure 1:
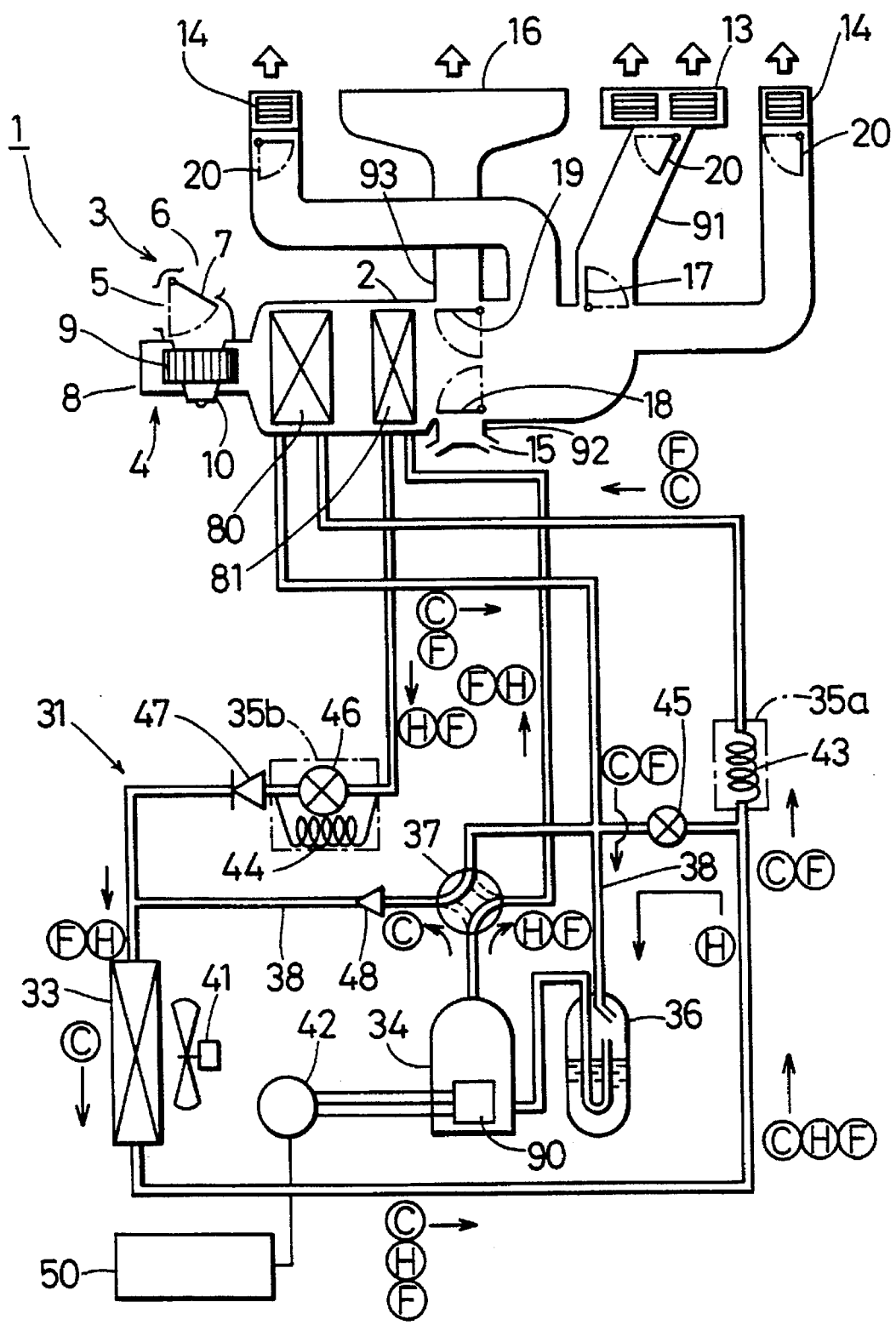
FIG. 1 is an entire schematic view of the embodiment according to the present invention.

Referring to FIG. 1, the entire construction of an embodiment according to the present invention will now be described.

An air duct 2 as an air flow passage for supplying air into an automotive compartment is disposed within the compartment, and an end of the air duct 2 on the air upstream side are provided with an recirculated/fresh air selecting means 3 and a blower unit 4.

The recirculated/fresh air selecting means 3 includes a circle air introduction inlet 5 which is communicated with the inside of the compartment for introducing air from the inside of the compartment (circle air) and a fresh air introduction inlet 6 which is communicated with the outside of the compartment for introducing air from the outside of the compartment (fresh air). Besides, the recirculated/fresh air selecting means 3 includes a recirculated/fresh air opening/ closing means (specifically an recirculated/fresh air selection door) 7 for selectively opening/closing the circle air introduction inlet 5 and the fresh air introduction inlet 6. To the recirculated/fresh air selecting door 7 is connected a servo motor which is a recirculated/fresh air driving means to drive the recirculated/fresh air selecting door 7 to operate.

To the under side (as viewed in FIG. 1) of the recirculated/fresh air selecting means 3 is connected the blower unit 4. Specifically, the blower unit 4 is composed of a fan case 8, a fan 9 rotatably mounted within the fan case 8 and a driving motor 10 for driving the fan 9 to rotate. When the fan 9 rotates, the feed rate of air blow into the compartment through the air duct 2 is regulated according to the revolution speed.

In the air downstream end part of the air duct 2 is formed each air blow outlet for blowing out the air passed through the air duct 2 into each part within the compartment. These air blow outlets are composed of center face air blow outlets 13 for blowing out mainly cool air from the center of the front part of the compartment toward the upper part of each passenger, side face air blow outlets 14 for blowing out mainly cool air from each side of the front part of the compartment toward the upper part of each passenger or each side windshield, a foot air blow outlet 15 for blowing out mainly warm air toward the lower part of each passenger and a defroster air blow outlet 16 for blowing out mainly warm air toward the front windshield.

At the inlet part of a center face air duct 91 which communicates the air duct 2 with the center face air blow outlet 13 is provided a means (specifically a center face air door) 17 for opening/closing the center face air duct 91; at the inlet part of a foot air duct 92 which communicates the air duct 2 with the foot air blow outlet 15 is formed a means (specifically a foot air door) 18 for opening/closing the foot air duct 92; at the inlet part of a defroster air duct 93 which communicates the air duct 2 with the defroster air blow outlet 16 is provided a means (specifically a defroster air door) 19 for opening/closing the defroster air duct 92.

At the center face air blow outlets 13 and the side face air blow outlets 14 are provided a means (specifically manual opening/closing doors) 20 for manually regulating the air blow rate according to the preference of the passengers.

On the upstream side of the air duct 2 is provided an evaporator 80 which is a means for cooling the air within the air duct 2, while on the downstream side of the air duct 2 is provided an indoor condenser 81 which is a means for heating the air within the air duct 2.

The above evaporator 80 construct a heat pump type refrigerating cycle 31 for cooling/heating the air within the compartment together with a compressor 34, an outdoor heat exchanger 33, a first pressure reducer 35a, a second pressure reducer 35b, a receiver 36, a four-way valve 37 for selecting the flow direction of refrigerant and a refrigerant piping 38 which connects these components.

The compressor 34 sucks, compresses and discharges refrigerant and is driven by an electric motor 90. This compressor 34 is mounted integrally with the electric motor 90 within a sealed case. The speed of rotation of the electric motor 90 is steplessly varied under the control of an inverter 42, and the discharge rate of the refrigerant from the compressor 34 steplessly varies according to the change in the speed of rotation of the electric motor 90.

The outdoor heat exchanger 34 performs heat exchange between the fresh air outside the compartment and the refrigerant at the outside of the duct 2. This outdoor heat exchanger 33 includes an outdoor fan 41 and is located in a position where the outdoor heat exchanger 34 is exposed to the running air caused by the running of the vehicle while the vehicle is in running.

The first pressure reducer 35a is specifically composed of a capillary tube 43 for cooling and inserted into a part of the refrigerant piping 38. This capillary tube 43 for cooling is designed to reduce the pressure of the refrigerant flowing from the outside heat exchanger 33 into the evaporator 80. In the refrigerant piping 38 connecting the capillary tube 43 and the four-way valve 37 is provided a means (specifically a solenoid valve) 43 for opening/closing the passage of this refrigerant piping 38. This solenoid valve 45 prevents the introduction of the high-pressure refrigerant from the outdoor heat exchanger 33 into the receiver 36 and permits the refrigerant to bypass the capillary tube 43 for cooling by opening during the heating operation.

The second pressure reducer 35b is specifically composed of a capillary tube 43 for heating and inserted into a part of the refrigerant piping 38. This capillary tube 43 for heating is designed to reduce the pressure of the refrigerant flowing from the indoor condenser 81 into the outside heat exchanger 33. In the refrigerant piping 38 laid out in parallel to the capillary tube 44 for heating is provided a means (specifically a solenoid valve) 46 for opening/closing the refrigerant piping 38. This solenoid valve 46 permits the refrigerant to bypass the capillary tube 44 for heating by opening during the defrosting operation and reduces the pressure of the high-pressure refrigerant from the indoor condenser 81 within the capillary tube 44 for heating by closing during the heating operation.

In the refrigerant piping 38 connecting the solenoid valve 46 and the outdoor heat exchanger 33 is provided a one-way valve 47 for preventing the flow of the refrigerant into the indoor condenser 81 during the cooling operation. On the other hand, in the refrigerant piping 38 connecting the outdoor heat exchanger 33 and the four-way valve 37 is provided a one-way valve 48 for preventing the flow of the refrigerant into the four-way valve 37 during the heating operation.

The receiver 36 is specifically composed of an accumulator and designed to accumulate the surplus refrigerant within the refrigerating cycle 31 on one hand and prevent the compressor 34 from hydraulic compression by sending only the gas-phase refrigerant into the compressor 34.

The four-way valve 37 is designed to change the direction of the refrigerant flow and permit the outdoor heat exchanger 33 to function as an evaporator or a condenser according to the operation mode (cooling operation, heating operation or defrosting operation) of the automotive air conditioning system.

During the above cooling operation, the refrigerant discharged from the compressor 34 flows to the four-way valve 37, the outdoor heat exchanger 33, the capillary tube 43 for cooling, the evaporator 80, the accumulator 36 and the compressor 34 in this order (as indicated by an arrow C in FIG. 1).

During the above heating operation, the refrigerant discharged from the compressor 34 flows to the four-way valve 37, the indoor heat exchanger 81, the capillary tube 44 for heating, the outdoor heat exchanger 33, the solenoid valve 45, the accumulator 36 and the compressor 34 in this order (as indicated by an arrow H in FIG. 1).

During the above defrosting operation, the refrigerant discharged from the compressor 34 flows to the four-way valve 37, the indoor heat exchanger 81, the solenoid valve 46, the outdoor heat exchanger 33, the capillary tube 43 for cooling, the evaporator 80, the accumulator 36 and the compressor 34 in this order (as indicated by an arrow F in FIG. 1) or otherwise flow as indicated by the arrow C in FIG. 1 in the same way as the above cooling operation.

The driving motor 10 for the fan 9, the four-way valve 37, the inverter 42, the outdoor fan 41 and each actuator (not illustrated) for driving each door is electrically controlled by a control unit 50.

The construction of a control panel 51 according to this embodiment will now be described referring to FIG. 2.

Figure 2:
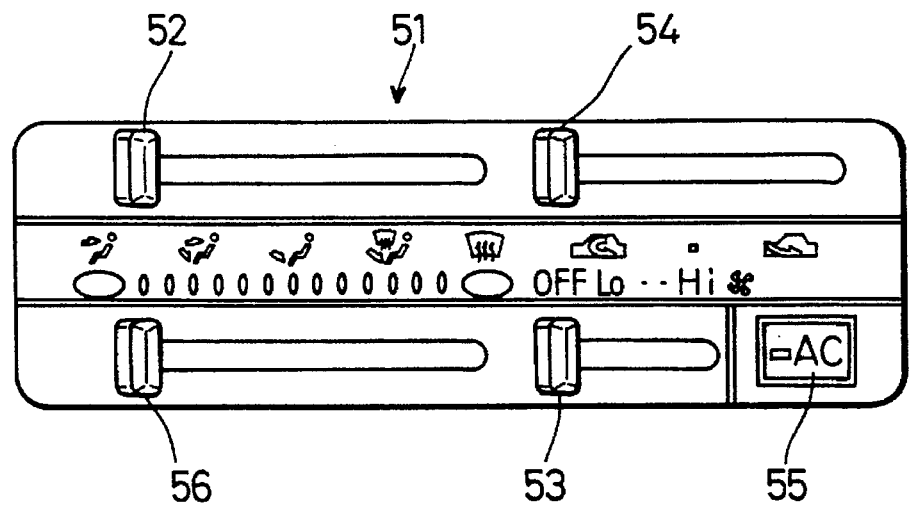
FIG. 2 is a front view of the control panel according to the above embodiment.

As illustrated in FIG. 2, the control panel 51 includes an air blow mode selector lever 52 for setting each air blow mode, an air blow rate setting switch 53 for regulating the rate of air blow into the compartment, a recirculated/fresh air selector lever 54 for setting the recirculated/fresh air selection mode, an A/C switch 55 for commanding the start/stop of the compressor 34 and a temperature setting lever 56 for regulating the revolution speed of the compressor 34. Incidentally, when this temperature setting lever 56 is shifted to the right, the air blow into the compartment becomes warm, and inversely when this temperature setting lever 56 is shifted to the left, the air blow into the compartment becomes cool.

Next, referring to FIG. 3, the control system according to this embodiment will be described.

Figure 3:
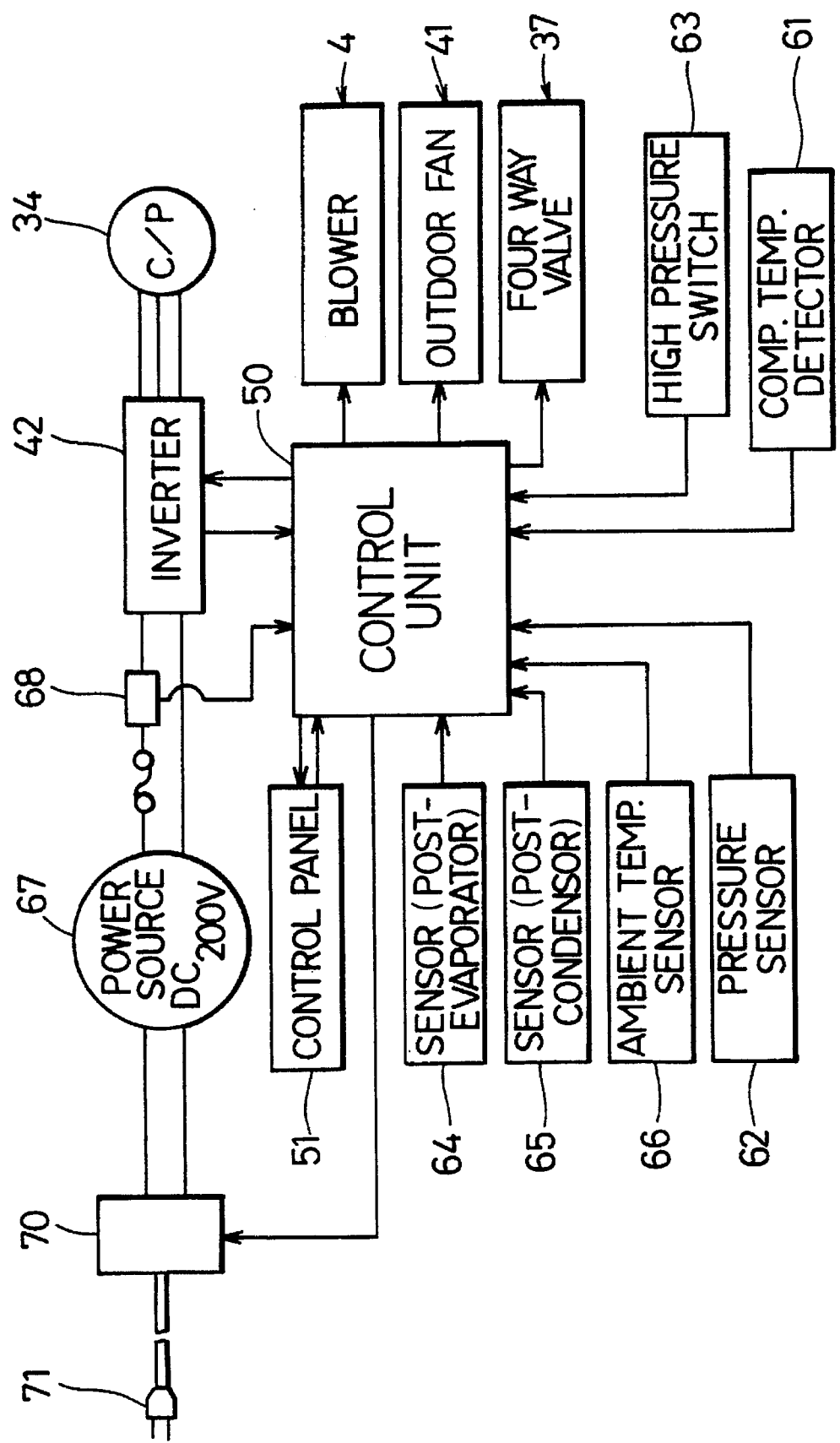
FIG. 3 is a block diagram illustrating the control system of the above embodiment.

As illustrated in FIG. 3, into the control unit 50 are inputted an air blow mode signal, an air blow rate signal and a recirculated/fresh air selection mode signal from the above control panel 51, a drive stop commanding signal from the compressor 34 and a revolution speed regulating signal from the compressor 34.

To the control unit 50 are connected a compressor temperature detector 61 for detecting the temperature of the compressor 34, a pressure sensor 62 for detecting the discharge pressure of the compressor 34, a high pressure switch 63 for detecting that the discharge pressure of the compressor 34 has become equal to or higher than a specified pressure level, a post-evaporator temperature sensor (specifically a thermistor) 64 for detecting the temperature of the air that has just passed through the indoor condenser 81, a post-condenser temperature sensor (specifically a thermistor) 65 for detecting the air that has just passed through the indoor condenser 81, an ambient temperature sensor 66 for detecting the ambient temperature and a current detector 68 for detecting the value of the current supplied from a battery 67 of 200 DCV (a power supply source of the electric vehicle) to the inverter 42. The control unit 50 receives a signal from each of the above sensors.

Each of the above signals inputted into the control unit 50 is converted into digital signals through a multiplexer and an A/D (analog-digital) converter and inputted into a microcomputer (not illustrated). This microcomputer is well-known, including a central process unit (CPU), a read only memory (ROM), a random access memory (RAM), input-output (I/O) port, etc.

The battery 67 is designed to supply electric power to a running motor (not illustrated) for generating the output of rotation to permit the vehicle run. This battery includes a battery charger 70 for charging as much electric power as consumed. This battery charger includes a plug 71. By plugging this plug 71 into the power supply source, the battery 67 is charged.

Then, referring to a process flow chart given in FIG. 4, the control of the revolution speed of the compressor 34 by means of the above control unit 50 and the refrigerating cycle 31 control will be described.

The control unit 50 starts when the battery 67 is turned ON. In Step 501, the RAM within the microcomputer is initialized and the initial value is outputted.

In the next Step 502, a judgment is performed whether the A/C switch 55 has been turned ON or not, and when the judgment is "YES", the process proceeds to Step 503, and when the judgment is "NO", the process proceeds to Step 513 and the target value f of the revolution speed of the compressor 34 is set to "0" (stop).

In the following Step 503, the mean value of the ambient temperature TAM detected by the ambient temperature sensor 66 is inputted. Here, the mean value means the mean value per second, for example.

Next, in Step 504, the setting position x' of the temperature setting lever 56 is inputted. Here, X' is "0" when the temperature setting lever 56 is in the left end position as shown in FIG. 2, "1" when the temperature setting lever 56 is in the right end position and any value between "0" and "1" when the temperature setting lever 56 is in the intermediate position according the position thereof.

How to input x' will be specifically described. Ii is so constructed that when the temperature setting lever 56 is shifted left and right (as shown in FIG. 2), a sliding terminal linked thereto slides on a resistor element. Therefore, when voltage is applied to both ends of the above resistor element, the output voltage of the sliding terminal varies according to the stop position of the sliding element. Therefore, by having the A/D converter within the control unit 50 read the output voltage and input the read into the microcomputer, the above x' is inputted.

Incidentally, in Step 504, it is so arranged that when the temperature setting lever 56 stops for 1 second or more in the same setting position, x=x' for the following reason.

The temperature setting lever 56 is manually operated by a passenger. This means that even if the passenger tries to stop the temperature setting lever 56 in setting the temperature, the passenger may erroneously shift the temperature setting lever 56 beyond the intended position. Furthermore, as described herein later, depending on the then ambient temperature, the shift of the temperature setting lever 56 may change the operation mode of the refrigerating cycle 31. The change in the operation mode of the refrigerating cycle 31 means, as described herein later, the refrigerating cycle 31 stops for a while.

As described above, depending on the then ambient temperature, the refrigerating cycle 31 may stops for a while by the erroneous excessive shift of the temperature setting lever 56. In order to prevent this problem, in Step 504, it is so arranged that only when the temperature setting lever 56 remains in the same position for a specified time period (1 second in this embodiment), x=x' and when x' varies within a specified time period (equivalent to the above erroneous operation), the then x' is not used for the control in Step 505 and subsequent steps. By this arrangement, even if a passenger erroneously operate the temperature setting lever 56, the problem that the refrigerating cycle 31 is unnecessarily stops can be prevented.

Incidentally, when x' varies within a specified time as the above erroneous operation, the previous x is used for the control in Step 505 and subsequent steps.

Then, in Step 505, a judgment is formed whether or not the ambient temperature TAM read in Step 503 is equal to or less than 15° C. If the judgment is positive, the process proceeds to Step 507, and if the judgment is negative, the process proceeds to Step 506. In Step 506, a judgment is formed whether or not the ambient temperature TAM is equal to or more than 30° C. If the judgment is positive, the process proceeds to Step 509, and if the judgment is negative, i.e., 15° C.<TAM<30° C., the process proceeds to Step 508.

Here, a case of TAM≦15° C. will be described.

Figure 5:
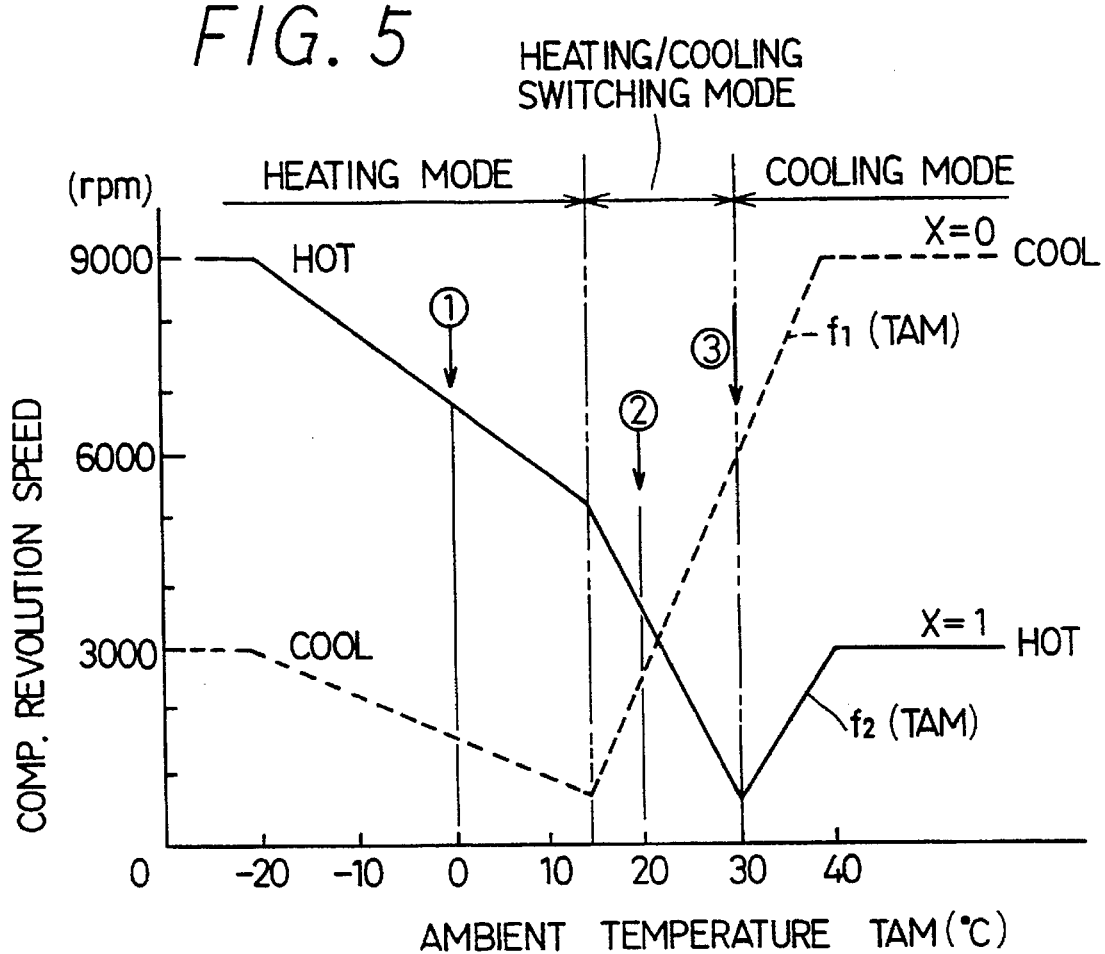
FIG. 5 is a characteristic diagram illustrating the correlation between the mean value of the ambient temperature (TAM) and the compressor revolution speed of f1(TAM) and f2(TAM) of the above embodiment.

In this case, based on the characteristics illustrated in FIG. 5 and stored in the ROM and the ambient temperature TAM inputted in Step 503 and by using the ability of linear interpolation, the revolution speed f1(TAM) of the compressor 34 when the temperature setting lever 56 is set to the left end position (x=0) as viewed in FIG. 2 and the revolution speed f2(TAM) of the compressor 34 when the temperature setting lever 56 is set to the right end position (x=1) as viewed in FIG. 2 are calculated.

Here, f1(TAM) indicated within a range of TAM≦15° C. illustrated in FIG. 5 is set to such a revolution speed that the passengers can sufficiently withstand the then heating ability even if the revolution speed of the compressor 34 is reduced to f1(TAM). On the other hand, f2(TAM) indicated within a range of TAM≦15° C. illustrated in FIG. 5 is set to such a revolution speed that it is no use increasing the heating ability by increasing the revolution speed of the compressor 34. Furthermore, it is so arranged that when the revolution speed of the compressor 34 is set to exactly the intermediate between f1(TAM) and f2(TAM), the air at a pleasant temperature blows out.

When the mean value TAM of the ambient temperature is 0° C., for example, as illustrated in (1) in FIG. 5, f1(TAM) is 1500 rpm and f2(TAM) is 6900 rpm. Then, when the compressor 34 is rotated with the revolution speed of 1500 rpm or more to provide heating to the inside of the compartment, the resultant heating ability is sufficient for the passengers to withstand at TAM=0° C. When the compressor 34 is rotated with a revolution speed of 6900 rpm or more to provide the heating to the inside of the compartment, the compressor 34 is unnecessarily driven. When the revolution speed is set to the value (4200 rpm) exactly intermediate between 1500 rpm and 6900 rpm, a pleasant air is blown out into the compartment with which the passengers feel not hot or not cold.

In the next Step 510, based on the following Equation 1 stored in the ROM, x calculated in the above Step 504 and f1(TAM) and f2(TAM) calculated in the above Step 507, the target revolution speed f(TAM, x) of the compressor is calculated.

$$f(TAM, x)=\{f2(TAM)-f1(TAM)\}\times x+f1(TAM) \qquad \text{[Equation 1]}$$

Therefore, when the ambient temperature TAM is 0° C. and the temperature setting lever 56 is in the left end position (x=0) as viewed in FIG. 2, for example, f(RAM, x)=1500 rpm from Equation 1, and when the temperature setting lever 45 is in the right end position (x=1) as viewed in FIG. 2, f(TAM, x)=6900 rpm, and when the temperature setting lever 56 is in the intermediate position (x=0.5), f(TAM, x)=4200 rpm.

In the next Step 515, the four-way valve 37 is controlled to provide the above heating operation.

In the following Step 517, if the discharge pressure of the compressor 34 detected by the pressure sensor 62 is abnormally high, the revolution speed of the compressor 34 is reduced to protect the four-way valve 37, the solenoid valves 45 and 46 and other components from damage.

In Step 518 following the above, the compressor 34 is controlled to set the revolution speed of the compressor 34 to the above target revolution speed f(TAM, x).

Then, in Step 519, the driving motor 10 for driving the rotation of the fan 9 is controlled, and in Step 520, the outdoor fan 41 is controlled. Then, the process returns to Step 502 to repeat the same routine.

The case of TAM≦15° C. has been described. Now, a case of TAM≧30° C. will be described.

In this case, based on the characteristics illustrated in FIG. 5 and stored in the ROM and the mean value TAM of the ambient temperature inputted in Step 503 and by using the ability of linear interpolation, the revolution speed f1(TAM) of the compressor 34 when the temperature setting lever 56 is set to the left end position (x=0) as viewed in FIG. 2 and the revolution speed f2(TAM) of the compressor 34 when the temperature setting lever 56 is set to the right end position (x=1) as viewed in FIG. 2 are calculated.

Here, f1(TAM) indicated within a range of TAM≧30° C. illustrated in FIG. 5 is set to such a revolution speed that it is no use increasing the cooling ability by increasing the revolution speed of the compressor 34. On the other hand, f2(TAM) indicated within a range of TAM≧30° C. illustrated in FIG. 5 is set to such a revolution speed that the passengers can sufficiently withstand the then cooling ability even if the revolution speed of the compressor is reduced to f2(TAM). Furthermore, it is so arranged that when the revolution speed of the compressor 34 is set to exactly the intermediate between f1(TAM) and f2(TAM), the air at a pleasant temperature blows out.

When the mean value TAM of the ambient temperature is 30° C., for example, as illustrated in (3) in FIG. 5, f1(TAM) is 5200 rpm and f2(TAM) is 500 rpm. Then, when the compressor 34 is rotated with the revolution speed of 500 rpm or more to provide cooling to the inside of the compartment, the resultant cooling ability is sufficient for the passengers to withstand at TAM=30° C. When the compressor 34 is rotated with the revolution speed of 5200 rpm or more to provide the heating to the inside of the compartment, the compressor 34 is unnecessarily driven. When the revolution speed is set to the value (2850 rpm) exactly intermediate between 500 rpm and 5200 rpm, a pleasant air is blown out into the compartment with which the passengers feel not hot or not cold.

In the next Step 512, based on the following Equation 2 stored in the ROM, x calculated in the above Step 504 and f1(TAM) and f2(TAM) calculated in the above Step 509, the target revolution speed f(TAM, x) of the compressor is calculated.

$$f(TAM, x)=\{f1(TAM)-f2(TAM)\}\times x+f2(TAM) \qquad \text{[Equation 2]}$$

Therefore, when the mean value TAM of the ambient temperature is 30° C. and the temperature setting lever 56 is in the left end position (x=0) as viewed in FIG. 2, for example, f(RAM, x)=5200 rpm from Equation 2, and when the temperature setting lever 45 is in the right end position (x =1) as viewed in FIG. 2, f(TAM, x)=500 rpm, and when the temperature setting lever 56 is in the intermediate position (x=0.5), f(TAM, x)=2850 rpm.

In the next Step 516, the four-way valve 37 is controlled to provide the above cooling operation, and the controls of Step 517 and subsequent steps are performed.

On the other hand, when 15°<TAM<30° C., unlike the case of TAM≦15° C. and the case of TAM≧30° C., the operation mode of the refrigerating cycle 31 is changed between the cooling operation and the heating operation according to the setting position of the temperature setting lever 56. This case will be described in the following passages.

In this case, in Step 508, based on the characteristics illustrated in FIG. 5 and stored in the ROM and the mean value TAM of the ambient temperature inputted in Step 503 and by using the ability of linear interpolation, the revolution speed f1(TAM) of the compressor 34 when the temperature setting lever 56 is set to the left end position (x=0) as viewed in FIG. 2 and the revolution speed f2(TAM) of the compressor 34 when the temperature setting lever 56 is set to the right end position (x=1) as viewed in FIG. 2 are calculated. Incidentally, when x=0, the operation mode is the cooling operation, and when x=1, the operation mode is the heating operation.

Here, f1(TAM) indicated within a range of 15° C.<TAM <30° C. illustrated in FIG. 5 is set to such a revolution speed that it is no use increasing the cooling ability by increasing the revolution speed of the compressor 34. On the other hand, f2(TAM) indicated within a range of 15° C.<TAM<30° C. illustrated in FIG. 5 is set to such a revolution speed that it is no use increasing the heating ability by increasing the revolution speed of the compressor 34. Furthermore, it is so arranged that when the revolution speed of the compressor 34 is set to exactly the intermediate between f1(TAM) and f2(TAM), the air at a pleasant temperature blows out.

In the next Step 511, based on the following Equation 3 stored in the ROM, x calculated in the above Step 504 and f1(TAM) and f2(TAM) calculated in the above Step 508, the target revolution speed f(TAM, x) of the compressor 34 is calculated. Incidentally, when the calculated f(TAM, x) is equal to or larger then 0 (f(TAM, x)≧0), the operation mode is the heating operation, and when f(TAM, x)<0, the operation mode is the cooling operation, and the actual revolution speed of the compressor 34 is expressed in absolute value.

$$f(TAM, x)=\{f1(TAM)+f2(TAM)\}\times x-f1(TAM) \quad \text{[Equation 3]}$$

Figure 6:
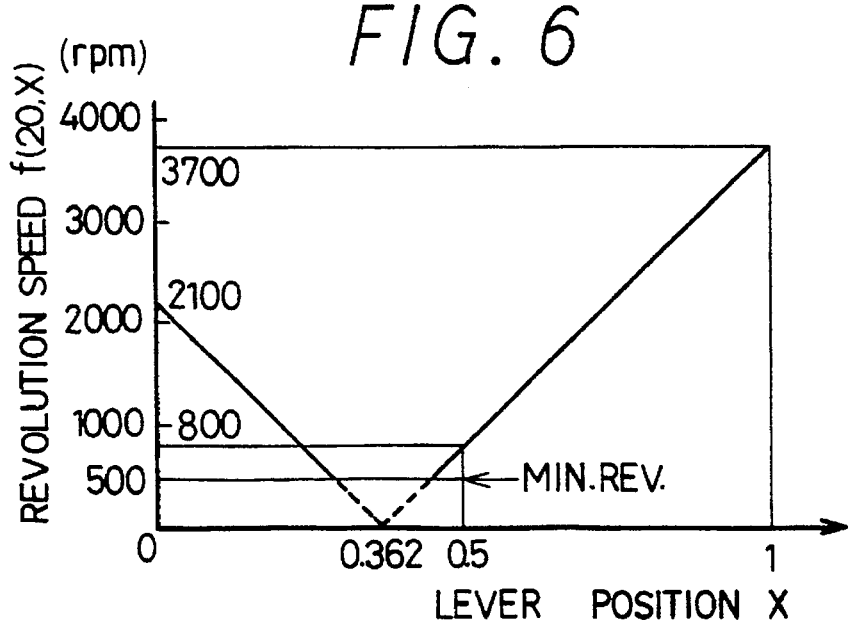
FIG. 6 is a characteristic diagram illustrating the correlation between position (x) of the temperature setting lever and the target revolution speed f(20, x) of the compressor.

The relation between x and f(20, x) when the mean value TAM of the ambient temperature is 20° C. is illustrated in FIG. 6. As evident from FIG. 6, when the temperature setting lever 56 is shifted to the right from a position of x=0 to a position of x=0.362, the revolution speed of the compressor 34 decreases according to the shift of the temperature setting lever 56. As the then operation mode of the refrigerating cycle 31 is the cooling operation, when the temperature setting lever 56 is shifted to the right, the cooling ability falls and the temperature of the air blow rises.

When the temperature setting lever 56 is shifted to the right and set to a position of x=0.362, the revolution speed f(20, x) of the compressor 34 is 0 and concurrently the operation mode switches from the cooling operation to the heating operation.

When the temperature setting lever 56 is further shifted to the right, the revolution speed of the compressor 34 increases according to the shift of the temperature setting lever 56. As the then operation mode is the heating operation, when the temperature setting lever 56 is shifted to the right, the heating ability rises and the temperature of the air blow rises.

Needless to say, when the temperature setting lever 56 is shifted from the right end position (x=1) to the left, the operation mode changes in a position of x=0.362 from the heating operation to the cooling operation.

As evident from FIG. 6, f(20, x) may be smaller than a specified small revolution speed (equivalent to 500 rpm in this embodiment) (indicated by a broken line). If this is the case, it is so controlled that the compressor 34 is turned ON and OFF at a slow cycle (e.g., 4 minutes) to set the mean value of the revolution speed to f(20, x).

After the completion of the control in the above Step 511, in the following Step 514, a judgment is formed whether or not the calculated f(TAM, x) is equal to or larger than 0 (f(TAM, x)≧0). If the judgment is positive (f(TAM, x)≧0), the four-way valve 37 is controlled in Step 515 to change the operation mode to the heating operation, and if the judgment is negative (f(TAM, x)<0), the four-way valve 37 is controlled in Step 516 to change the operation mode to the cooling operation.

In the next Step 517, if the discharge pressure from the compressor 34 detected by the pressure sensor 62 is abnormally high, it is so controlled that the revolution speed of the compressor 34 is reduced. If this situation is immediately after the operation mode of the refrigerating cycle 31 is changed, it is so controlled for pressure equalization that the compressor 34 is stopped and the restart of the compressor 34 is prohibited for a specified time period (e.g., 1 to 3 minutes).

The first reason for the above control for pressure equalization is that if the pressure difference between the refrigerant sucking side and the refrigerant discharge side is large after the compressor 34 is stopped and nevertheless the compressor 34 is started, the driving torque of the compressor 34 would greatly increases and then start failure would be caused and therefore the above pressure difference is reduced by holding the compressor 34 at a stop for a specified time period.

The second reason for the above control for pressure equalization is that if the temperature setting lever 56 is frequently shifted, the operation mode of the refrigerating cycle 31 would frequently change, then the compressor 34 would frequently be driven and stopped, then the lubricating oil would flow out of the inside of the compressor 34, then insufficient lubrication would be caused and then the compressor 34 may be damaged.

After the completion of the above Step 517, the above routing is repeated by performing the controls of Step 518 and subsequent steps.

As described above, in the above embodiment, as the range of the revolution speed of the compressor 34 is set according to the ambient temperature TAM, the revolution speed of the compressor 34 can be controlled according to the ambient temperature.

In the above embodiment, the operation mode of the refrigerating cycle 31 is set to (1) the heating operation when TAM≦15° C., (2) the heating/cooling selecting operation when 15° C.<TAM<30° C. and (3) the cooling operation when TAM ≧30° C., and the mode of refrigerating cycle 31 is automatically set according to the then ambient temperature- Therefore, there is no need to provide a cooling operation commanding switch or a heating operation commanding switch, and consequently there is no need to provide a means for commanding the mode of the refrigerating cycle 31 in the instrument panel and the cost can be saved so much.

Also, in the above embodiment, it is so arranged that only when the temperature setting lever 56 remains at a stop for a specified time period, the revolution speed of the compressor 34 is controlled by using the stop position. Therefore, even if a passenger sets the temperature setting lever 56 to a position deviated from a desired position and immediately returns the temperature setting lever 56 to the desired position, the setting value of the above desired position is used for controlling the revolution speed of the compressor 34. As a result, the revolution speed of the compressor 34 can be controlled as a passenger desires.

Figure 4:
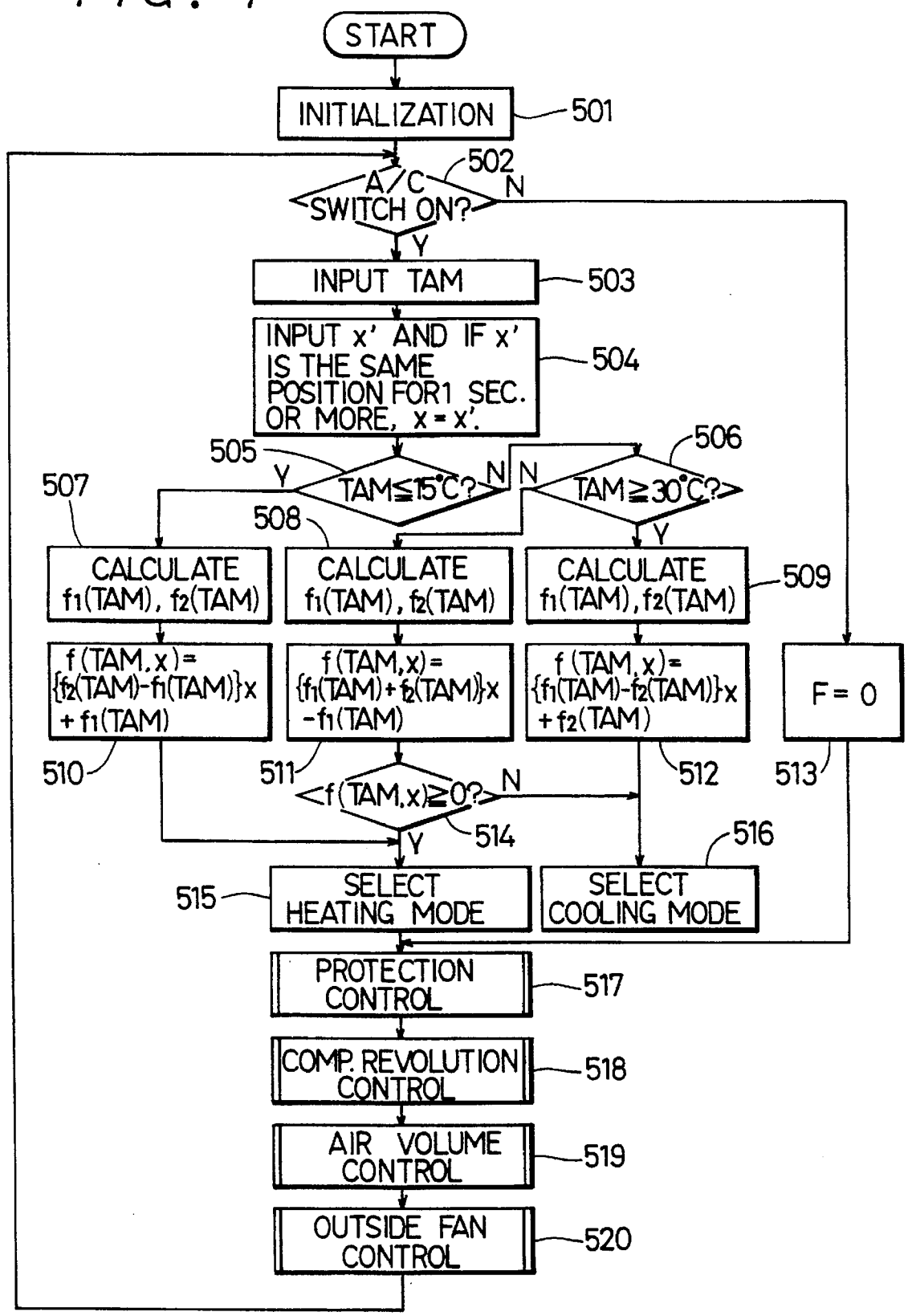
FIG. 4 is a control flow chart of the microcomputer of the above embodiment.

On the other hand, when the cooling operation is changed to the heating operation or the heating mode is changed to the cooling mode in Step 518 illustrated in FIG. 4, the compressor 34 stops and then remains at a stop for a while.

Therefore, compared with a case where the compressor 34 is restarted immediately after the operation mode is changed, the driving torque required for restarting the compressor 34 can be reduced and the compressor 34 can be protected from damage due to insufficient lubricating oil.

Incidentally, in the above embodiment, the air blowing means according to the present invention is composed of the blower unit 4, the air flow passage according thereto is composed of the air duct 2, the heat exchanger according thereto is composed of the evaporator 80 and the indoor condenser 81, the temperature setting means according thereto is composed of the temperature setting lever 56, the means for controlling the revolution speed according thereto is composed of the control unit 50 and the inverter 42, the ambient temperature detecting means according thereto is composed of the ambient temperature sensor 66 and Step 503, and the revolution speed regulating means according thereto is composed of Steps 507 through 509.

The first temperature judging means according to the present invention is composed of Step 505, the second temperature judging means according thereto is composed of Step 506, the switching means according thereto is composed of the four-way valve 37, the first selection controlling means according thereto is composed of Step 515, and the second selection controlling means according thereto is composed of Step 516.

The setting value detecting means according to the present invention is composed of Step 504, the means for controlling the increase in the revolution speed according thereto is composed of Step 510, and a means for controlling the decrease in the revolution speed according thereto is composed of Step 512.

The temperature judging means according to the present invention is composed of Steps 505 and 506, the first selection controlling means according thereto is composed of Steps 516 and 514, and a second selection controlling means according thereto is composed of Steps 515 and 514.

The second revolution speed controlling means according to the present invention is composed of Step 511.

The stop controlling means according to the present invention is composed of Step 518.

The minimum temperature position of the temperature setting means according to the present invention is in the left end position of the temperature setting lever 56 as viewed in FIG. 2, and the maximum temperature position of the temperature setting means according thereto is in the right end position of the temperature setting lever 56 as viewed in FIG. 2.

The intermediate value according to the present invention is x which makes f(TAM, x)=0 in the above Equation 3.

Modification

In the above embodiment, in automatically controlling the changing of the operation mode based on the ambient temperature, the range of the revolution speed of the compressor 34 is regulated according to the ambient temperature. However, in an embodiment which manually setting the switching of the operation mode according to this modification, the range of the revolution speed of the compressor 34 may be regulated according to the ambient temperature. In the following passages, this modification will be described in detail.

The entire construction of this modification is illustrated in FIG. 1, and therefore the description thereof will be omitted. A control panel 100 according to this modification is illustrated in FIG. 7.

Figure 7:
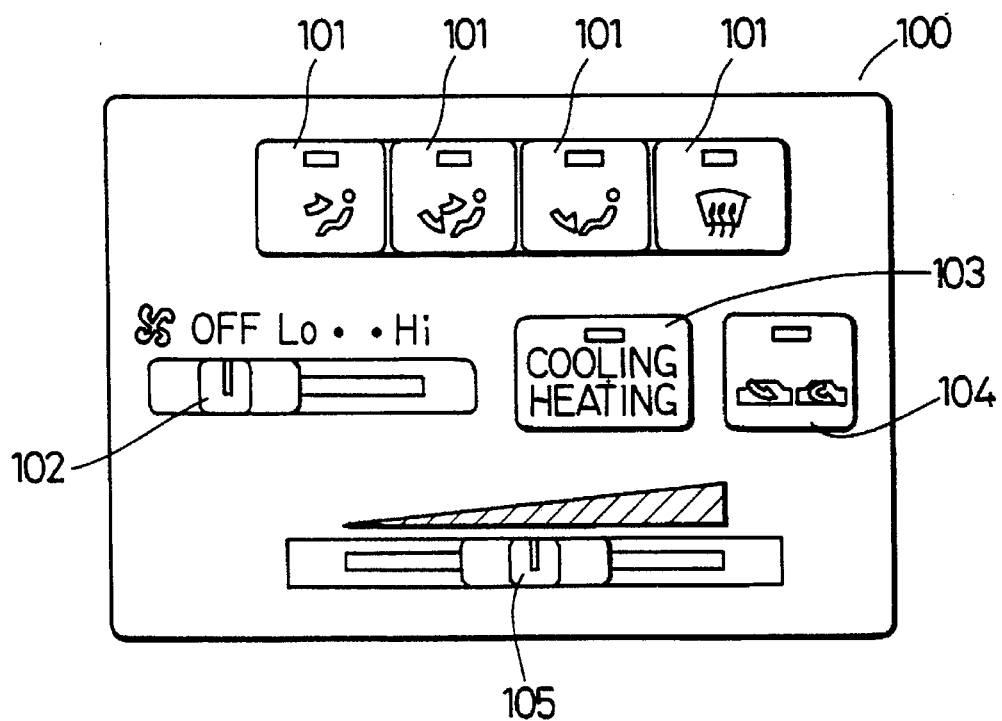
FIG. 7 is a front view of the control panel of a modification according to the present embodiment.

As illustrated in FIG. 7, the control panel 100 includes a push button type blow mode selector switch 101 for setting each air blow mode, an air blow rate setting switch 102 for regulating the rate of air blow into the compartment, an operation mode selector switch 103 for selecting the operation mode (cooling operation, heating operation), a recirculated/fresh air selector switch 104 for setting the recirculated/fresh air selection mode, and a revolution speed control lever 105 composing the temperature setting means according to the present invention stated and used for regulating the revolution speed of the compressor 34.

Incidentally, irrespective of the operation mode (cooling mode, heating mode), when the above revolution speed controlling lever 105 is shifted to the left as viewed in FIG. 7, the revolution speed of the compressor 34 decreases, and when the number of revolutions controlling lever 105 is shifted to the right, the revolution speed of the compressor 34 increases.

Figure 8A:
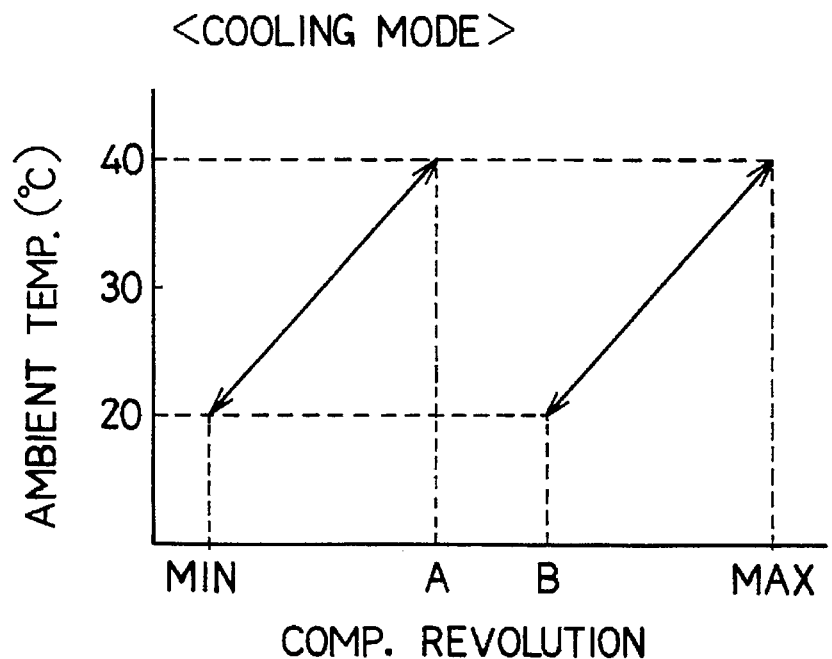
FIGS. 8A and 8B are graphs illustrating the range of the revolution speed of the compressor set by the setting position of the revolution speed controlling lever of the above modification.

When the cooling mode is set by using the above operation mode selector switch 103, if the then ambient temperature is the most severe to the vehicle within the practical operation range (e.g., 40° C.), the revolution speed (A) is set as illustrated in FIG. 8(a) so that the maximum revolution speed (MAX) of the compressor 34 can be obtained with the revolution speed controlling lever 105 set in the right end position and the minimum required cooling ability can be maintained at the above ambient temperature (40° C.) when the revolution speed control lever 105 is set to the left end position.

When the ambient temperature is low (e.g., 20° C.) and a large cooling load is not required in the cooling mode, the revolution speed (B) is set so that the minimum revolution speed (MIN) of the compressor 34 can be obtained with the revolution speed controlling lever 105 set in the left end position and the minimum required cooling ability can be maintained at the above ambient temperature (20° C.) when the revolution speed control lever 105 is set to the right end position.

When the ambient temperature is higher than 40° C. in the cooling mode, it is so arranged that the revolution speed range set for the ambient temperature of 40° C. in the cooling mode can be obtained, and when the ambient temperature is lower than 20° C. in the cooling operation, it is so arranged that the revolution speed range set for the ambient temperature of 20° C. in the cooling mode can be obtained. When the ambient temperature is higher than 20° C. and lower than 40° C., both the revolution speed with the revolution speed controlling lever 105 set in the right end position and the revolution speed with the revolution speed controlling lever 105 set in the left end position increase as the ambient temperature increases.

As described above, in the cooling mode, the revolution speed of the compressor 34 set with the revolution speed controlling lever 105 in the right end position, i.e., the first revolution speed according to the present invention, is regulated within a range from B to MAX according to the increase in the ambient temperature, and the revolution speed of the compressor 34 set with the revolution speed controlling lever 105 in the left end position, i.e., the second revolution speed according to the present invention, is regulated within a range from MIN to A according to the increase in the ambient temperature.

Figure 8B:
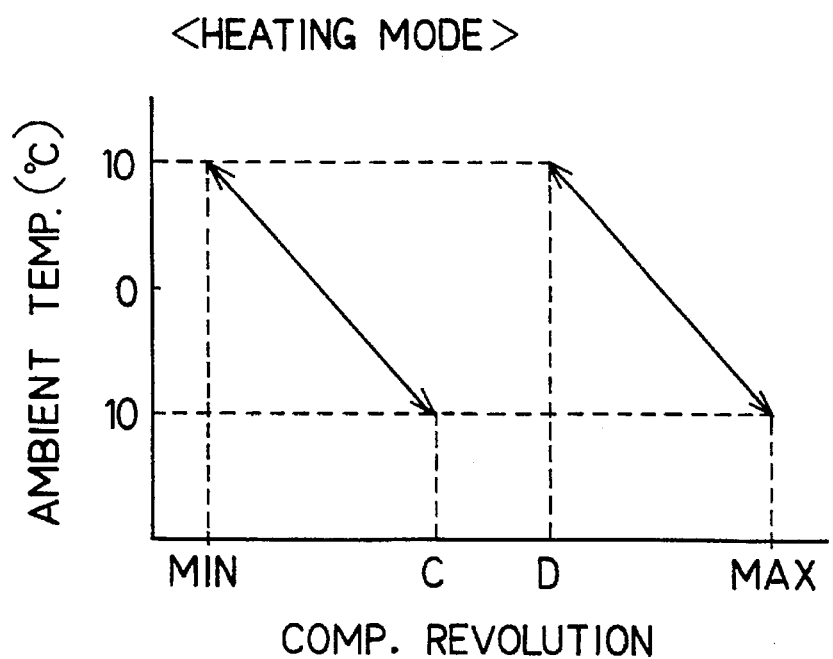

On the other hand, when the heating operation is set by using the operation mode selector switch 103, if the then ambient temperature is the most severe to the vehicle within the practical operation range (e.g., −10° C.), the revolution speed (C) is set as illustrated in FIG. 8(b) so that the maximum revolution speed (MAX) of the compressor 34 can be obtained with the revolution speed controlling lever 105 set in the right end position and the minimum required heating ability can be maintained at the above ambient temperature (−10° C.) when the revolution speed control lever 105 is set to the left end position.

When the ambient temperature is high (e.g., 10° C.) and a large heating load is not required in the heating mode, the revolution speed (D) is set so that the minimum revolution speed (MIN) of the compressor 34 can be obtained with the revolution speed controlling lever 105 set in the left end position and the minimum required cooling ability can be maintained at the above ambient temperature (10° C.) when the revolution speed control lever 105 is set to the right end position.

When the ambient temperature is lower than −10° C. in the heating mode, it is so arranged that the revolution speed range set for the ambient temperature of −10° C. in the heating operation can be obtained, and when the ambient temperature is higher than 10° C. in the cooling mode, it is so arranged that the revolution speed range set for the ambient temperature of 10° C. in the heating operation can be obtained. When the ambient temperature is higher than −10° C. and lower than 10° C., both the revolution speed with the revolution speed controlling lever 105 set in the right end position and the revolution speed with the revolution speed controlling lever 105 set in the left end position decrease as the ambient temperature increases.

As described above, in the heating mode, the revolution speed of the compressor 34 set with the revolution speed controlling lever 105 in the right end position, i.e., the second revolution speed according to the present invention is regulated within a range from MAX to D according to the increase in the ambient temperature, and the revolution speed of the compressor 34 set with the revolution speed controlling lever 105 in the left end position, i.e., the first revolution speed according to the present invention is regulated within a range from C to MIN according to the increase in the ambient temperature.

Incidentally, the characteristics illustrated in FIGS. 8(a) and 8(b) have been stored in the ROM.

As described above, after the control unit 50 sets the first revolution speed and second revolution speed in each operation mode, the revolution speed of the compressor 34 according to the setting position of the revolution speed controlling lever 105 is calculated based on an equation like the Equation 1 or 2, and the calculated revolution speed is outputted to the inverter so that the actual revolution speed of the compressor 34 follows this calculated revolution speed.

As described above, also in this modification, as the revolution speed of the compressor 34 is arranged to be regulated according to the ambient temperature, the temperature of the air blow can minutely controlled, excessive cooling or heating within the compartment can be prevented, and energy saving which is the most important factor of the electric vehicle can be achieved.

In the above modification, the revolution speeds (A though D) of the compressor 34 are set without considering sunlight. In actual applications, however, the required air conditioning ability varies according to the ambient temperature affected by the presence of sunlight. Therefore, it may be so arranged that the revolution speeds A through D varies according to the sunlight quantity.

What is claimed is:

1. An automotive air conditioning system comprising:

an air blowing means for generating air flow;

an air flow passage for introducing air from the air blowing means;

a heat exchanger provided within the air flow passage for cooling or heating the air;

a compressor composing a refrigerating cycle with the heat exchanger and driven by a driving power supplied from an external driving power source;

a temperature setting means for setting a temperature of air blown out from the air flow passage into a compartment within a range from a minimum temperature to a maximum temperature;

a revolution speed controlling means for controlling a revolution speed of the compressor based on a setting value set by the temperature setting means;

an ambient temperature detecting means for detecting a temperature of outdoor air; and a revolution speed regulating means for regulating a first revolution speed of the compressor when the temperature setting means is set to the minimum temperature and a second revolution speed of the compressor when the temperature setting means is set to the maximum temperature based on an ambient temperature detected by the ambient temperature detecting means.

2. The automotive air conditioning system according to claim 1, further comprising:

a first temperature judging means for judging whether the detected ambient temperature is equal to or lower than a first temperature or not;

a second temperature judging means for judging whether the detected ambient temperature is equal to or higher than a second temperature which is higher than the first temperature or not;

a selecting means for selecting the heat exchanger to function as one of a heat exchanger for cooling and a heat exchanger for heating;

a first selection controlling means for controlling the selecting means when the detected ambient temperature is judged to be equal to or lower than the first temperature by the first temperature judging means to make the heat exchanger function as a heat exchanger for heating; and a second selection controlling means for controlling the selecting means when the detected ambient temperature is judged to be equal to or higher than the second temperature by the second temperature judging means to make the heat exchanger function as a heat exchanger for cooling;

wherein the revolution speed regulating means sets the first revolution speed and second revolution speed to be lower as the detected ambient temperature rises when the detected temperature is judged to be equal to or lower than the first temperature by the first temperature judging means; and the revolution speed regulating means sets the first revolution speed and second revolution speed to be faster as the detected ambient temperature rises when the detected temperature is judged to be equal to or higher than the second temperature by the second temperature judging means.

3. The automotive air conditioning system according to claim 2, further comprising:

a setting value detecting means for detecting a setting value of the temperature setting means;

a revolution speed increase controlling means for controlling the revolution speed controlling means when the detected ambient temperature is judged to be equal to or lower than the first temperature by the first temperature judging means so that the revolution speed of the compressor can be higher as the setting value detected by the setting value detecting means can be on the maximum temperature side; and a revolution speed decrease controlling means for controlling the revolution speed controlling means when the detected ambient temperature is judged to be equal to or higher than the first temperature by the second temperature judging mean so that the revolution speed of the compressor can be lower as the setting value detected by the setting value detecting means can be on the maximum temperature side.

4. The automotive air conditioning system according to claim 1, further comprising:

a selecting means for selecting the heat exchanger to function as a heat exchanger for cooling or as a heat exchanger for heating;

a setting value detecting means for detecting a setting value of the temperature setting means;

a temperature judging means for judging whether the detected ambient temperature is higher than a first temperature and lower than a second temperature which is higher than the first temperature or not;

a first selection controlling means for controlling the selecting means when the detected ambient temperature is judged to be higher than the first temperature and lower than the second temperature by the temperature judging means and the setting value detected by the setting value detecting means is on the minimum temperature side from a specified intermediate value between the minimum temperature and the maximum temperature so that the heat exchanger can be functioned as a heat exchanger for cooling; and a second selection controlling means for controlling the selecting means when the detected ambient temperature is judged to be higher than the first temperature and lower than the second temperature by the temperature judging means and the setting value detected by the setting value detecting means is on the maximum temperature side from the specified intermediate value between the minimum temperature and the maximum temperature so that the heat exchanger can be functioned as a heat exchanger for heating;

wherein the revolution speed regulating means sets the first revolution speed to be higher and the second revolution speed to be lower as the detected ambient temperature rises when the detected ambient temperature is judged to be higher than the first temperature and lower than the second temperature.

5. The automotive air conditioning system according to claim 4, further comprising:

a second revolution speed controlling means for controlling the revolution speed controlling means when the detected ambient temperature is judged to be higher than the first temperature and lower than the second temperature by the temperature judging means so that the revolution speed of the compressor can be lower as the detected setting value becomes nearer the specified intermediate value side from the minimum temperature side and the revolution speed of the compressor can be higher as the detected setting value becomes closer the maximum temperature side from the specified intermediate value.

6. The automotive air conditioning system according to claim 1, wherein when the revolution speed of the compressor is lower than a specified low revolution speed, a revolution speed equivalent to a revolution speed which is lower than the slow revolution speed is obtained by repeating drive and stop of the compressor at a specified cycle.

7. The automotive air conditioning system according to claim 4, further comprising:

a stop controlling means for holding the compressor at a stop mode for a specified time period when the heat exchanger is changed from a heat exchanger for heating to a heat exchanger for cooling or from a heat exchanger for cooling to a heat exchanger for heating.

8. The automotive air conditioning system according to claim 1, wherein the external driving power source is an electric motor driven by electric power supplied from a battery.

9. The automotive air conditioning system according to claim 1, wherein the revolution speed controlling means includes an inverter.

10. The automotive air conditioning system according to claim 1, further comprising an operation mode selecting means for selecting an operation mode of the refrigerating cycle by an air conditioning system operator;

wherein the revolution speed regulating means regulates the first revolution speed and second revolution speed based on the detected ambient temperature for each operation mode selected by the operation mode selecting means.

11. The automotive air conditioning system according to claim 3, wherein when the revolution speed of the compressor is lower than a specified low revolution speed, a revolution speed equivalent to a revolution speed which is lower than the slow revolution speed is obtained by repeating drive and stop of the compressor at a specified cycle.

12. The automotive air conditioning system according to claim 11, wherein the revolution speed controlling means includes an inverter.

13. The automotive air conditioning system according to claim 5, wherein when the revolution speed of the compressor is lower than a specified low revolution speed, a revolution speed equivalent to a revolution speed which is lower than the slow revolution speed is obtained by repeating drive and stop of the compressor at a specified cycle.

14. The automotive air conditioning system according to claim 13, wherein the revolution speed controlling means includes an inverter.

* * * * *